C. Roberts,

Tooth Brush.

No. 87,070.    Patented Feb 16, 1869.

Witnesses:
Leopold Evert
A. N. Marr

Inventor:
Christopher Roberts
Alexander Mason
Att'ys

CHRISTOPHER ROBERTS, OF NEWARK, NEW JERSEY.

Letters Patent No. 87,070, dated February 16, 1869.

IMPROVED TOOTH-BRUSH.

The Schedule referred to in these Letters Patent and making part of the same.

*To all whom it may concern:*

Be it known that I, CHRISTOPHER ROBERTS, of Newark, in the county of Essex, and in the State of New Jersey, have invented certain new and useful Improvements in the Manufacture of Tooth-Brushes; and do hereby declare that the following is a full, clear, and exact description thereof, reference being had to the accompanying drawings, and to the letters of reference marked thereon.

The nature of my invention consists in a tooth-brush of soft India rubber, where the brush and handle are moulded in one piece, over a metal bar, to make them stiff.

In order to enable others skilled in the art to which my invention appertains, to make and use the same, I will now proceed to describe its construction and operation, referring to the annexed drawings, which form a part of this specification, and in which—

Figure 1:
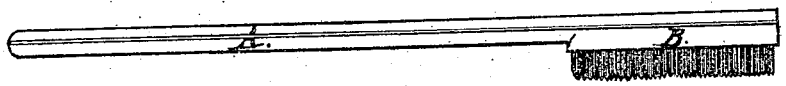

Figure 1 is a side view, and

Figure 2:
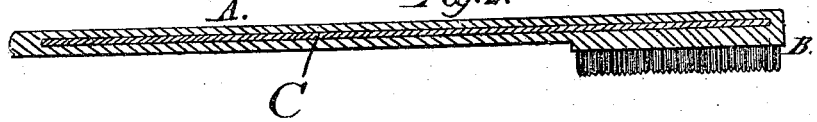

Figure 2, a longitudinal section.

A represents the handle, and B, the brush, moulded of India rubber, in one piece, over a metal bar, C, which is flat, and extends the whole length of the handle and head of the brush. This bar makes the handle stiff, as without it the brush would be too soft to handle.

I am aware that a brush-head, with brush of India rubber, is not new.

Having thus fully described my invention,

What I claim as new, and desire to secure by Letters Patent, is—

As an article of manufacture, a tooth-brush, where the brush and handle are moulded in one solid piece, over a metal bar, substantially as herein set forth.

In testimony that I claim the foregoing, I have hereunto set my hand, this 10th day of September, 1868.

CHRISR. ROBERTS.

Witnesses:
JOHN M. UNDERWOOD,
C. L. EVERT.